United States Patent Office 3,287,460
Patented Nov. 22, 1966

3,287,460
HYDROGENATION PROCESS FOR THE PREPARATION OF PIPERIDYL-(4)-ETHERS
Max Thiel and Kurt Stach, Mannheim, Germany, assignors to C. F. Boehringer & Soehne G.m.b.H., Mannheim-Waldhof, Germany, a corporation of Germany
No Drawing. Filed Dec. 28, 1962, Ser. No. 247,842
Claims priority, application Germany, Jan. 3, 1962, B 65,401
13 Claims. (Cl. 260—293.3)

This invention relates to piperidyl-(4)-ethers and to methods of producing such ethers. More particularly the invention relates to piperidyl-(4)-ethers represented by the formula:

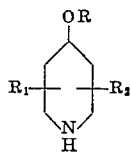

wherein R represents alkyl or cycloalkyl, and $R_1$ and $R_2$ represent hydrogen or alkyl.

The compound 4-methoxy-piperidine has already been prepared (Renshaw and Corns, J. Am. Chem. Soc., 60, 745/1938) by the action of sodium methylate on 4-bromopiperidine hydrobromide but the remaining compounds of the class as defined by the above formula are new. The known process has not proved suitable for the commercial preparation of the methoxy-piperidyl-(4)-ether for it is very cumbersome and difficult to carry out, and furthermore results in the production of poor yields. As has already been noted, the other members of the class of piperidyl-(4) ethers have not hitherto been prepared.

The piperidyl-(3)-ethers have, on the other hand, been readily and easily prepared by the catalytic hydrogenation of piperidyl-(3)-ethers, using Raney nickel as catalyst (cf. Paul and Tchelitcheff, Bull. Soc. Chem., France, 1947, 341). Attempts to hydrogenate pyridyl-(4)-ethers in a like manner with Raney nickel catalysts results in the formation not of the desired piperidyl-(4)-ethers but rather of N-alkylpyridones as a result of the isomerization of the starting compounds. Thus, for example, hydrogenation of piperidyl-(4)-ethers in the presence of Raney nickel catalysts proceeds in the following manner:

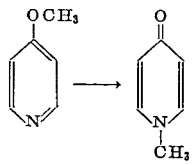

The exact same results are obtained when platinum is used as catalyst.

In accordance with the invention, it has now surprisingly been found that the piperidyl-(4)-ethers of the invention can be produced simply and in excellent yields by hydrogenating the corresponding pyridyl-(4)-ethers in the presence of a ruthenium catalyst. In place of the pyridyl-(4)-ethers, their N-oxides are also suitable for use in accordance with the invention. The pyridyl-(4)-ethers and their N-oxides starting materials are readily obtainable and/or can be prepared by methods well known to the art.

The hydrogenation reaction of the invention is carried out at elevated pressures and elevated temperatures and preferably at a temperature of about 130–140° C. and hydrogen pressures of 100 to 200 atmospheres. This reaction to hydrogenate the 4-alkoxy pyridines is preferably conducted in the presence of small amounts of water and/or of alcohol. It has proven particularly advantageous to use as the alcohol an alcohol ROH, in which R corresponds to the alkoxy group in the pyridine derivative.

The following are among the ruthenium catalysts which can be employed in accordance with the invention: metallic ruthenium, preferably on an appropriate support, such as for example animal charcoal, ruthenium salts, as for example ruthenium halides or ruthenates, or ruthenium oxides. The commercially available ruthenium (IV) oxide represents a particularly valuable catalytic agent.

The class of piperidyl-(4)-ethers are in accordance with the invention for the first time made economically available by the process of the present invention. In addition, new and valuable piperidyl-(4)-ethers are for the first time disclosed.

The piperidyl-(4)-ethers of the invention are useful as intermediates in the preparation of medicinal agents.

The following examples illustrate in more detail the present invention without, however, limiting thereto:

EXAMPLE 1

4-methoxy-piperidine (a) From 4-methoxy-pyridine.—140 g. of 4-methoxy-pyridine (prepared by the method of Haitinger and Lieben, Mh. Chem. 6, 279/1885), 10 cc. of methanol and 10 cc. of water are placed into a one-liter autoclave together with 0.5 g. of ruthenium (IV) oxide and, at an initial pressure of 150 atmospheres hydrogen, the temperature of the mixture is slowly raised, with agitation, to 140° C. at which temperature the hydrogenation sets in. If the temperature rises above 155–160° C., the heat must be immediately shut off. Cooling should be used where necessary. Hydrogenation is complete in 4 hours. After cooling, the mixture is filtered free of catalyst, acidified with mineral acid and concentrated. The concentrate is then made alkaline with soda lye and extracted with ether. The distillation of the ether extract yields 103 to 111 grams (70–75% of theory) of 4-methoxy-piperidine having a boiling point of 163–166° C.

(b) 63 g. 4 - methoxy-pyridine-N-oxide (prepared according to the method of Ochiai, J. Org. Chem. 18, 534/1953) are mixed with 100 cc. of water and 0.5 g. of ruthenium (IV) oxide and brought to a temperature of 140° C. in a one-liter autoclave at an initial pressure of 170 atmospheres hydrogen. When the hydrogenation begins, cooling must be used if necessary to see that a temperature of 155–160° C. is not exceeded. The mixture is agitated for 4 hours at 140° C., additional hydrogen is introduced and agitation continued for 2 more hours. Concentration and purification is carried out as has been described above. There is obtained 40 to 42 grams (69–72% of theory) of 4-methoxy-piperidine having a boiling point of 160–166° C.

EXAMPLE 2

4-(n-propoxy)-piperidine 4-(n-propoxy)-pyridine (prepared by the method of Koenigs and Neumann, Ber. 48, 956/1915) is hydrogenated in a manner analogous to that described in Example 1a but in place of the methanol propanol is used. The yield of 4-(n-propoxy)-piperidine having a boiling point of 195–198° C. amounts to 76% of theory.

EXAMPLE 3

4-isopropoxy-piperidine 4-isopropoxy-pyridine (produced in a manner analogous to the method desscribed by Koenigs and Neumann supra) is hydrogenated as in Example 1a but in this instance isopropanol is used as the solvent. The yield of 4-isopropoxy-piperidine having a boiling point of 182–185° C. amounts to 85% of theory.

EXAMPLE 4
*4-ethoxy-piperidine*

The procedure described in Example 1a is followed using 4-ethoxy-pyridine (prepared as described in J. Pharm. Soc. Japan, 63/1943, p. 265) and using ethanol as a solvent. The yield of 4-ethoxy-piperidine having a boiling point of 174–176° C. amounts to 75% of theory.

We claim:
1. The process of preparing compounds having the formula

wherein R represents alkyl having from 2 to 3 carbon atoms, which comprises hydrogenating a member selected from the group consisting of pyridyl-(4)-ethers and the corresponding N-oxides, the free base having the formula

wherein R is as above defined in the presence of a ruthenium catalyst.

2. The process according to claim 1 wherein said catalyst is a member selected from the group consisting of ruthenium metal on a support, ruthenium salts, and ruthenium oxides.

3. The process according to claim 1 wherein said catalyst is ruthenium (IV) oxide.

4. The process according to claim 2 which comprises effecting said hydrogenating at a temperature of 130–140° C.

5. The process according to claim 1 which comprises effecting said hydrogenating at a pressure of 100–200 atmospheres.

6. The process according to claim 1 which comprises effecting said hydrogenating at a temperature of 130–140° C. and at a pressure of 100–200 atmospheres.

7. The process according to claim 1 which comprises effecting said hydrogenating in the presence of a small amount of a member selected from the group consisting of water, alcohol, and mixtures thereof.

8. The process according to claim 7 wherein said alcohol corresponds to the formula ROH in which R has the meaning as above set out.

9. The process of preparing 4-methoxy-piperidine which comprises hydrogenating 4-methoxy-pyridine in the presence of ruthenium (IV) oxide as catalyst under reaction conditions including a temperature of from 140–160° C., a hydrogen pressure of 150 atmospheres and the presence of methanol.

10. The process of preparing 4-methoxy-piperidine which comprises hydrogenating 4-methoxy-pyridine-N oxide in the presence of ruthenium (IV) oxide as catalyst under reaction conditions including a temperature of 140° C., a hydrogen pressure of 170 atmospheres and water.

11. The process of preparing 4-(n-propoxy)-piperidine which comprises hydrogenating 4-(n-propoxy)-pyridine in the presence of ruthenium (IV)-oxide as catalyst under reaction conditions including a temperature of 140–160° C., a hydrogen pressure of 150 atmospheres hydrogen and propanol.

12. The process for preparing 4-isopropoxy-piperidine which comprises hydrogenating 4-isopropoxy-pyridine in the presence of ruthenium (IV)-oxide as catalyst under reaction conditions including a temperature of from 140–160° C., a hydrogen pressure of 150 atmospheres, and isopropanol.

13. The process of preparing 4-ethoxy-piperidine which comprises hydrogenating 4-ethoxy-pyridine in the presence of ruthenium (IV)-oxide under reaction conditions including a temperature of 140–160° C., a hydrogen pressure of 150 atmospheres and ethanol.

References Cited by the Examiner
UNITED STATES PATENTS

| | | | |
|---|---|---|---|
| 2,831,862 | 4/1958 | Biel | 260—294.7 |
| 2,915,505 | 12/1959 | Koontz et al. | 260—294.7 X |
| 2,932,646 | 4/1960 | Biel | 260—294.7 |

OTHER REFERENCES

Chem. Abst., 1st Decennial Index, pages 4008–9 (1918).
Koenigs et al.: Chem. Abst., vol. 9, pages 2254[6] (1915).
Renshaw et al.: Jour. Am. Chem. Soc., vol. 60, pages 745–7 (1938).

WALTER A. MODANCE, *Primary Examiner.*
NICHOLAS S. RUZZO, JOHN D. RANDOLPH,
*Examiners.*
R. PRICE, A. D. SPEVACK, *Assistant Examiners.*